H. M. LAMBERT.
METHOD OF MANUFACTURING TIRES.
APPLICATION FILED FEB. 19, 1919. RENEWED JULY 16, 1920.

1,351,856.

Patented Sept. 7, 1920.
4 SHEETS—SHEET 1.

INVENTOR
H. M. Lambert.
BY
Fred G. Dieterich
ATTORNEYS

H. M. LAMBERT.
METHOD OF MANUFACTURING TIRES.
APPLICATION FILED FEB. 19, 1919. RENEWED JULY 16, 1920.

1,351,856.

Patented Sept. 7, 1920.

INVENTOR
H. M. Lambert.
BY
Fred G. Dieterich
ATTORNEYS

H. M. LAMBERT.
METHOD OF MANUFACTURING TIRES.
APPLICATION FILED FEB. 19, 1919. RENEWED JULY 16, 1920.
1,351,856.
Patented Sept. 7, 1920.
4 SHEETS—SHEET 3.
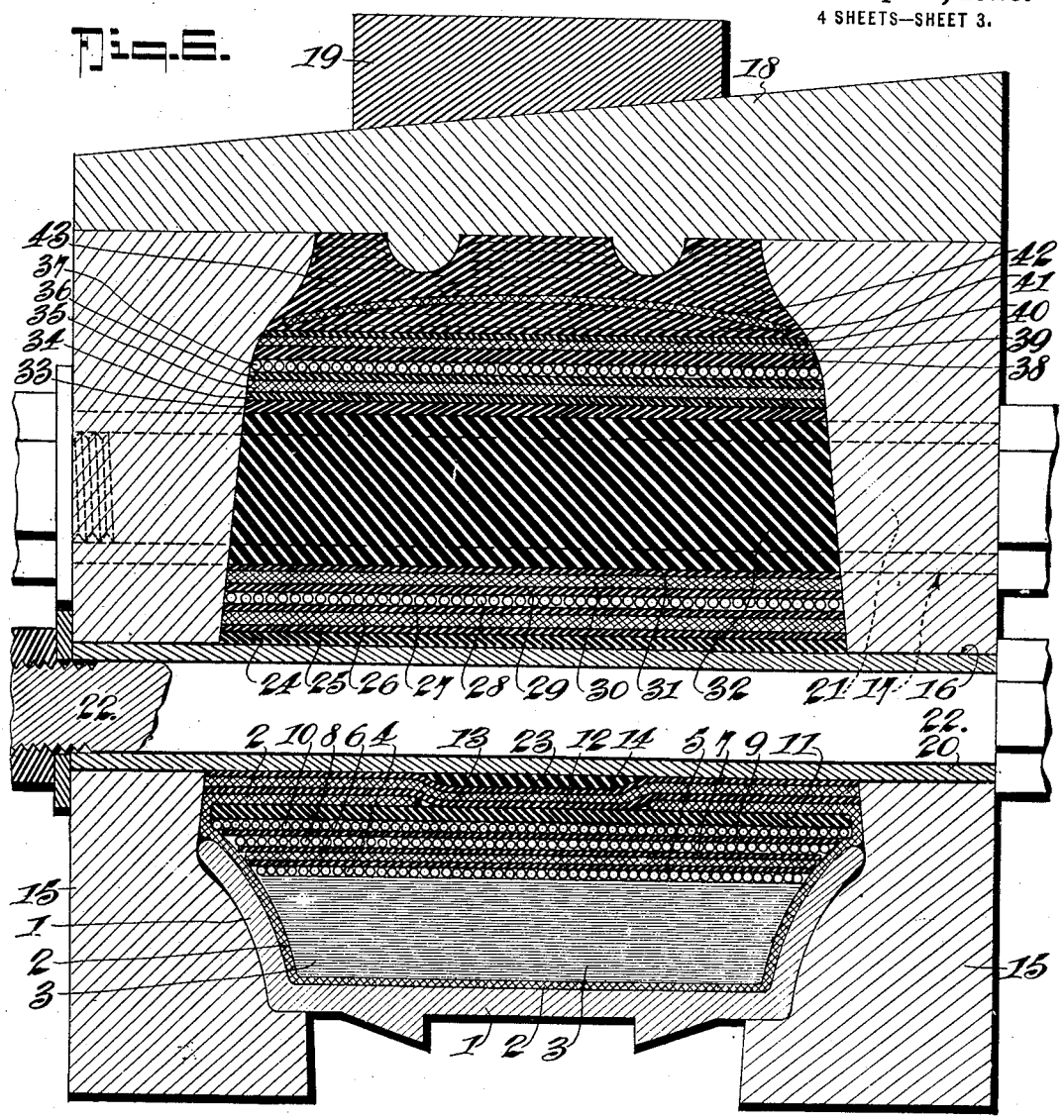
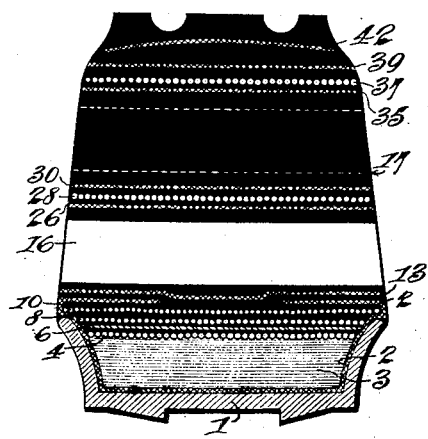
INVENTOR
H. M. Lambert.
BY
ATTORNEYS H. M. LAMBERT.
METHOD OF MANUFACTURING TIRES.
APPLICATION FILED FEB. 19, 1919. RENEWED JULY 16, 1920.

1,351,856.

Patented Sept. 7, 1920.

INVENTOR
H. M. Lambert.
BY
Fred G. Dieterich
ATTORNEYS

UNITED STATES PATENT OFFICE.

HENRY M. LAMBERT, OF PORTLAND, OREGON.

METHOD OF MANUFACTURING TIRES.

1,351,856.   Specification of Letters Patent.   Patented Sept. 7, 1920.

Application filed February 19, 1919, Serial No. 278,017. Renewed July 16, 1920. Serial No. 396,877.

*To all whom it may concern:*

Be it known that I, HENRY M. LAMBERT, a citizen of the United States, residing at Portland, in the county of Multnomah and State of Oregon, have invented certain new and useful Improvements in Methods of Manufacturing Tires, of which the following is a specification.

My invention relates to the art of tire manufacturing and it especially has for its object to provide a method of manufacturing cushion tires of the type shown in my application filed November 6, 1917, Serial No. 200,478. Tires of this kind consist of a base structure engaged with the wheel rim, a non-stretchable flexible corded belt formed in the base structure and one or more non-stretchable flexible corded belts spaced concentrically around the first belt, there being blocks of cushion rubber located at intervals between the respective belts, or there being perforated slabs of rubber located between the same. In making a tire of the kind described it is necessary, in order to attain the desired results of long life, durability and a high degree of resiliency, to make the belt structure flexible and as nearly absolutely non-stretchable as can be done, and to unite the base structure, the belt structure and the intermediate cushion blocks or slabs, into a permanent whole so that the said parts will not disintegrate, become separated one from the other, or cause friction between the various parts of the tire, with the consequent generation of heat causing "decay" of the structure which would disintegrate the same.

My present invention therefore has for its principal object to provide a method of manufacture whereby it is possible to build up a tire of the type stated in such manner that the greatest degree of durability and life may be attained in the tire, and all danger of disintegration, due to friction heat, is practically avoided, and furthermore a tire is produced that will be of great permanent resiliency (practically the same as that of a properly inflated pneumatic tire of the same size) a tire that is extremely tough and durable and one which will retain its original form and shape throughout a long mileage service and under load variations between wide limits.

In the drawings,—

Fig. 6 is a cross section showing the tire completed in the mold, the mold parts being assembled and pressed together in the final position they assume prior to vulcanization.

Fig. 9 is a cross section of the tire after vulcanization has taken place and the tire has been removed from the molds.

In carrying out my method, I shall describe the same as in making a tire having two rows of cushion slabs or blocks with a corresponding number of transverse holes or openings through the same.

Figure 1:
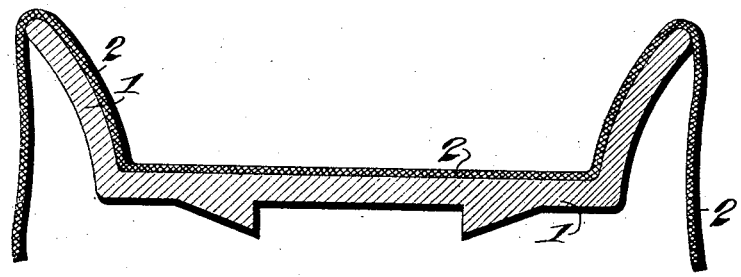
Figure 1 shows a rim in cross section with the initial fabric layer in place.

*The base structure:*—When the tire is to be built up on the ordinary rim used for pneumatic tires, the channel of the rim 1 being deeper than is needed when my tire is to be used, is covered by a layer of rubberized fabric 2, the same being laid with the heavy "frictioned" side outward and the edges extending over the sides of the rim, as shown in Fig. 1. The rim, it should be stated, is first mounted on a spider so it may be turned on its axis. In the channel, after the fabric 2 has been placed, is wound a suitable amount of any satisfactory filling material, as for instance, building paper which is used between the walls of building structures. This paper is wound onto the rim from a roll to the depth desired, it being preferably wound as tightly as possible, and thus forms the filler 3. After the filler has been placed, a layer of cord 4 is wound under extremely high tension spirally around the filler 3. In winding the cord, the end of the same is first tied to the rim or the spider on which the rim is mounted or fastened in any suitable way so that the cord can be put under its maximum tension while being wound. The cord is drawn through a tension device such as is used in connection with the manufacture of stretchless belting, see my application Serial No. 238,203, filed June 4, 1918, and as the rim is turned on its axis the cord is drawn through the tension device, and is laid while being stretched to its maximum limit of elongation. This tightly compacts the filler 3 by the force exerted on the cord in trying to contract, i. e., a force exerted in opposition to the stretching force. The cord is stretched to the maximum amount it will stand without breaking. As soon as the cord has been laid and while it is yet under tension, it is looped under several of the laid strands so that it may be anchored there before being cut from the source of supply. Any suitable method of anchoring may be employed so long as the cord is not allowed to retract from its maximum stretched condition. The cord may be rubberized before being laid or during the laying process by passing the cord through a bath of rubber cement while it is stretched under its maximum tension, but if the cord has not been previously rubberized it is very advisable, if not entirely necessary, to rubberize it after it has been laid and this may be done by painting over the cord with rubber cement, which should be done before the next layer of material is put on.

After the cord layer 4 has been placed I place a band or strip of cushion gum 5 over the cord and over the cushion gum is placed a strip of rubberized fabric 6 which is followed by other alternate layers of cushion gum 7, cord 8, cushion gum 9, cord 10 and a final layer of extra thick gum 11. It should be understood that the number of layers of cords in the base structure and the number of layers of cushion gum and the number of layers of fabric may be variable, depending upon the size tire being made.

The parts numbered from 4 to 11, inclusive, may be considered as a stretchless fabric and cord belt, which functions to hold the filler tightly on the rim and the provision of the rubberized fabric 2 will insure the same against slipping around the rim.

Figure 2:
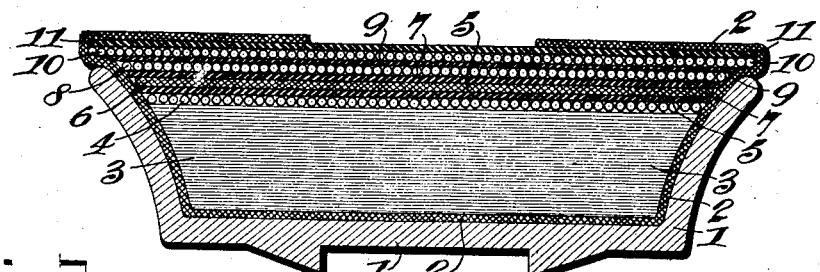
Fig. 2 is a cross section of the rim showing the base structure completed.

The next operation is to fold over the edges of the fabric 2 on top of the cushion gum layer 11, as shown in Fig. 2 of the drawings. While the fabric may be of sufficient width that when folded over the edges will meet yet it is preferable to have them spaced somewhat apart so that the adjacent cushion gum layer 12 may unite with the layer 11 leaving the rubberized fabric edges embedded between the same at the sides.

The parts when completed to the extent shown in Fig. 2 constitute the base structure on which the first cushion element of the tire is built.

Figure 3:
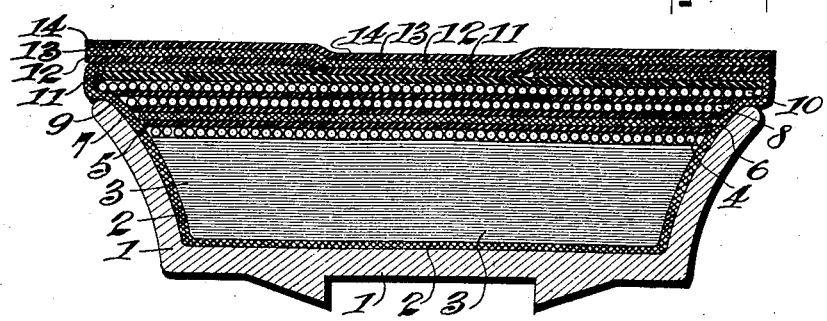
Fig. 3 is a view similar to Fig. 2 showing the application of the other alternate layers of cushion gum and fabric, the outermost layer being one of cushion gum and is designed to become integral with the cushion blocks in the final process of vulcanization.

*The first cushion element:*—In making up the first cushion element a layer of cushion gum 12 is put over the inturned fabric 2 and this is followed by a strip of rubberized fabric 13 and another strip or layer of cushion gum 14, the latter being one preferably having a peculiar affinity for the rubber cushion blocks, presently referred to. After the cushion gum and fabric layers 12, 13 and 14 have been placed, the structure shown in Fig. 3 is then placed between the side plates 15 of the mold and pipes 20 are inserted in the inner rows of holes 16 of the mold which form the apertures or transverse passages through the cushion slab of the tire. The mold sides have as many rows of holes 16—17 (staggered with relation to one another) as it is desired to employ cushion elements in the tire and this will depend upon the size of the tire and the work to which it is to be put. The mold side plates 15 are held together in their proper relation by bolts 22 which pass through a number of the pipes 20 located at suitable intervals. As soon as the structure shown in Fig. 3 has been placed between the mold plates and the pipes 20 inserted in the holes 16, the same will now be ready for the building up of the remainder of the tire. After the pipes 20 have been placed, it will be observed that spaces will be left between adjacent pipes and into these spaces are placed rectangular blocks of cushion gum 23 of a depth slightly greater than the diameter of the pipes. These blocks of cushion gum 23 are made of a special grade of rubber particularly adapted for the purpose desired. The blocks are placed in the spaces and pressed down on the strip 14 of cushion gum to which they will adhere on contact. After the blocks 23 have been all placed a layer 24 of cushion gum having a peculiar affinity for the rubber of the blocks is placed over the same. The parts 14, 23 and 24 constitute the first cushion element.

*The second stretchless belt:*—The cushion gum layer 24 is followed by another layer 25 of another grade of cushion gum (a cheaper grade may be employed here, if desired) and this layer is followed by a layer of rubberized fabric 26, which is in turn followed by a layer of cushion gum 27, a layer of cord 28 wound under maximum tension while being laid, a layer of gum 29 and another layer of fabric 30 which is in turn followed by a layer 31 of cushion gum of a grade having peculiar affinity for the cushion blocks. As many layers of cord 28, fabric 26 and 30 and interposed cushion gum layers may be employed as may be found desirable, as these elements will vary in number according to the size of the tire and the purpose for which it is to be put. The parts 25, 26, 27, 28, 29 and 30 constitute the second stretchless belt structure which is used to restrain the first cushion element against the action of centrifugal force and hold it from disintegration on that account.

If the tire is to have but one cushion slab the tread structure is formed over the second stretchless belt but in the case illustrated where two cushion slabs are used, the second cushion slab is formed over the second stretchless belt.

*The second cushion slab:*—This consists of a layer of cushion gum 31 which is placed over the fabric 30 and is preferably of a material having peculiar affinity for the rubber blocks 32. A second row of pipes 21 is placed in the second row of holes 17 and between the adjacent pipes 21 the blocks 32 of cushion gum are placed, the said blocks also being of slightly greater depth than the diameter of the core pipes 21. Over the blocks is then placed a strip 33 of cushion gum having a peculiar affinity for the material of the blocks. The parts 31 to 33 inclusive, constitute the second cushion element and this is followed by the third or outer stretchless belt structure.

*The third stretchless belt structure:*—The cushion gum layer 33 is followed by another layer of different grade of cushion gum 34, which is in turn followed by a strip 35 of rubberized fabric, then a strip 36 of cushion gum and on this strip 36 is wound the cord layer 37. The cord layer 37 is followed by an extra thick cushion gum layer 38 and that is followed by a layer 39 of rubberized fabric and a layer of cushion gum 40. The parts 34 to 39, inclusive, form the third or outer stretchless belt.

It should be stated that unless the cord 37 was previously rubberized it should be painted with rubber cement after being laid so that the interstices of the cord may be filled by the cement.

*The tread section:*—Over the gum layer 40 is placed one or more layers of tread gum 41 which are followed by the breaker strip of fabric 42 and that in turn is followed by the remaining layers of tread gum 43 necessary to fill up the mold and produce the desired tread thickness. The parts 41, 42 and 43 may be considered as constituting the tread.

Figure 4:
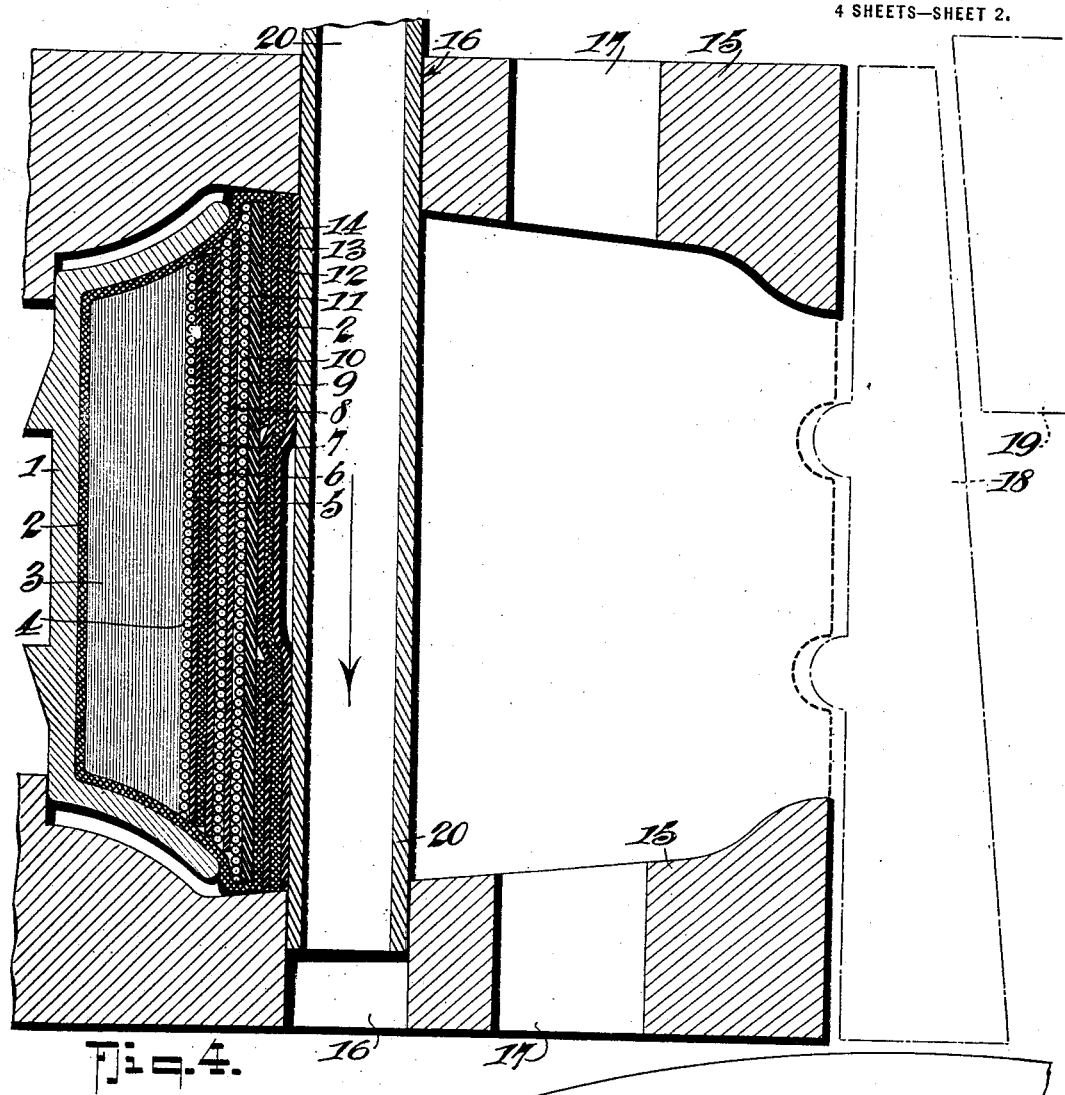
Fig. 4 is a cross section showing the parts illustrated in Fig. 3 as placed between the side mold plates and showing the core pipes being placed in position in the first row of holes.
Figure 5:
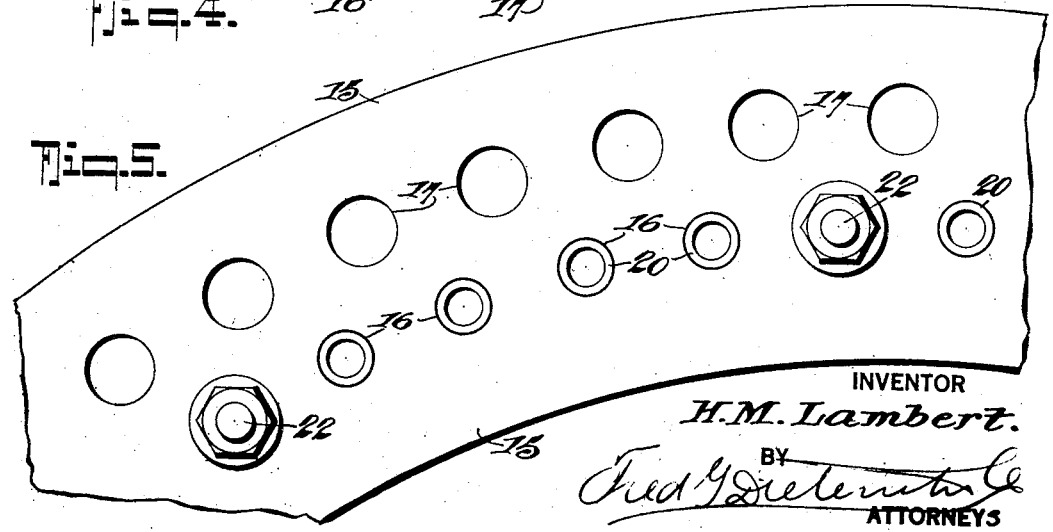
Fig. 5 is a detail elevation of a part of the structure shown in Fig. 4.
Figure 7:
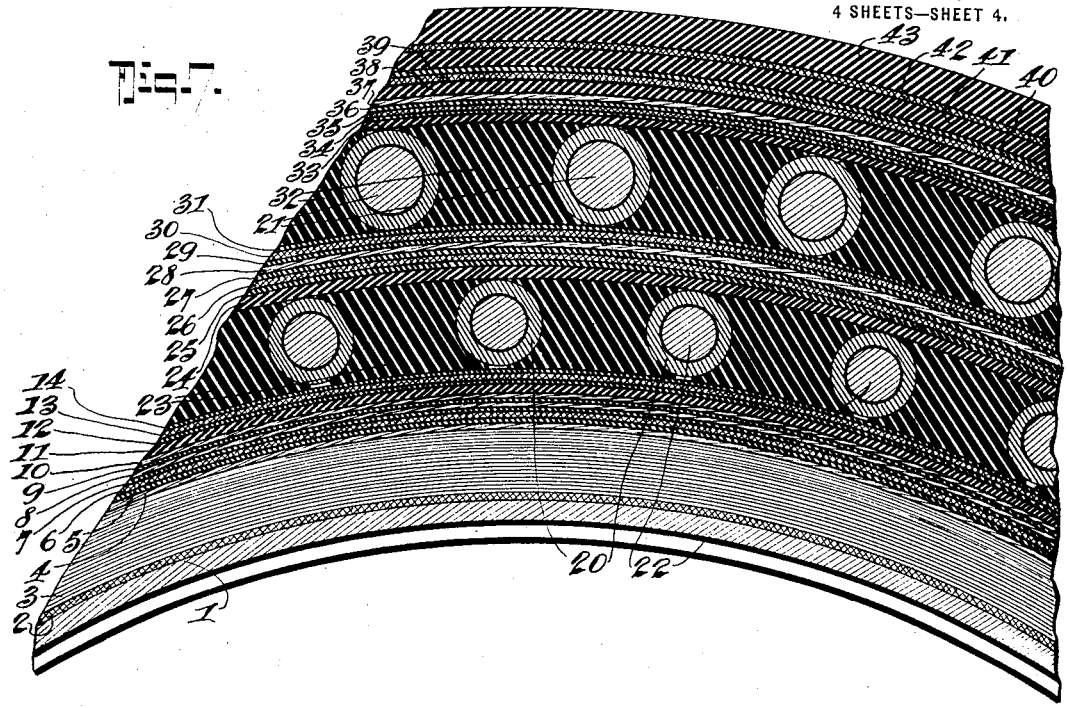
Fig. 7 is a detail vertical longitudinal section of the structure shown in Fig. 6 prior to vulcanization.
Figure 8:
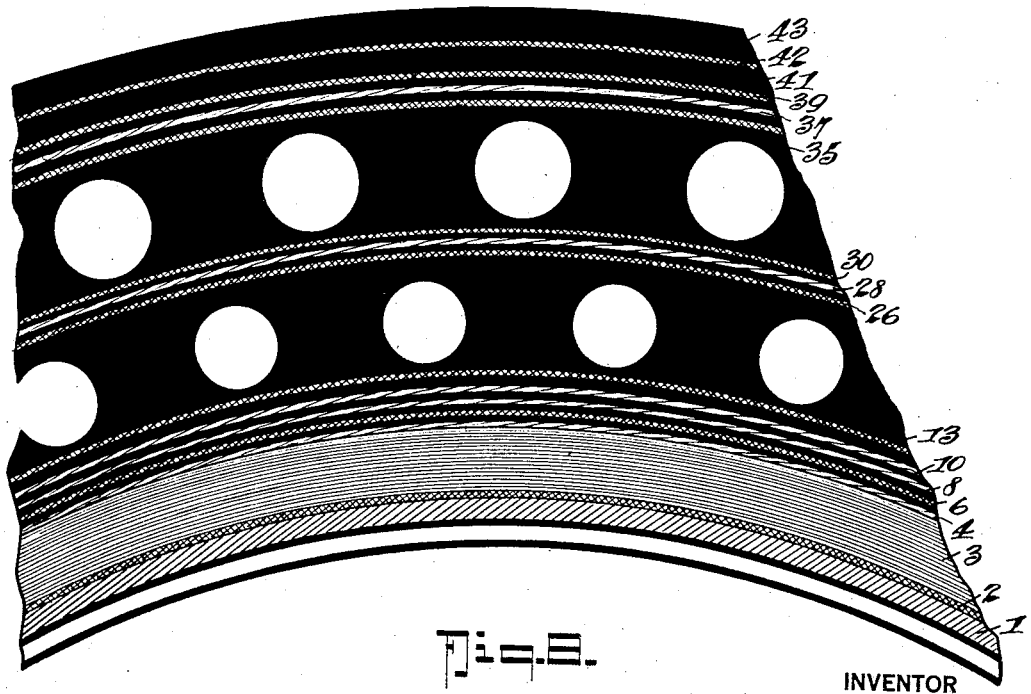
Fig. 8 is a view similar to Fig. 7 after vulcanization has taken place and showing how the parts have united into an integral mass.

It should be observed that any number of layers of cord and fabric may be used in the stretchless belt sections of the tire as may be desired. This depends upon the size of the tire and the work to which the tire is to be put. It is also to be noted that in laying the cord under tension it embeds itself more or less into the under layer of cushion gum and at the same time contracts the blocks 23 so that they are deformed to follow around the core pipes and be pressed into all spaces that may be present. From Fig. 4, it will be observed that the mold sides 15 are not drawn up completely to their final position during the laying of the tire structure in the mold or the building up of the same but after the parts have been built up and the mold has been filled then the peripheral mold sections 18 are placed and brought together by their contracting devices, preferably a ring 19 having a wedge action on the sections 18. After which, the sides 15 of the mold are drawn or pressed together until they assume the position shown in Fig. 6. This is preferably done by placing the mold in a hydraulic press and at the same time tightening up on the bolts 22 or the bolts 22 alone may be used for the purpose, if desired. The drawing together of the plates 15 serves to contact the mass and insure the filling of all the spaces that may be present and at the same time applying a pressure to the blocks 23 and 32 which will squeeze them in their longitudinal direction or transversely with respect to the tire as a whole, thus imparting to the blocks a tension in the direction of the radius of the wheel, and thereby adding to the tension on the stretchless belts. After the mold parts have been brought to their final closed position the mold is placed in a suitable vulcanizing kettle and the tire is vulcanized. On removal from the kettle, the outer or peripheral mold sections are taken off, the bolts 22 removed, the pipes 20 and 21 removed in a suitable manner, preferably with the use of a punching apparatus and the plates 15 are removed from the tire, thus leaving the tire in its finished state on the rim.

It will be observed that after vulcanization, the adjacent layers of cushion gum are merged into one and the layers of cushion gum adjacent to the several cushion blocks of a row are likewise merged with said blocks, thus providing, as it were, an endless slab of cushion rubber perforated at intervals by transverse holes formed by the core pipes, the holes of one set being staggered with relation to those of another set.

This produces a tire of exceptional merit possessing the advantageous features referred to in my application for tire referred to.

The cushion gum layers above and below the cord layer are united into one through union with the rubber cement contained in the cord as well as through the union of the rubber that may be pressed between adjacent loops of the cord so we have practically a layer of cord embedded integrally into a cushion gum strip.

The laying of the cord under maximum elongating tension makes it certain that the belt structures will not stretch or lengthen in use and hence all danger of the tire becoming flabby is avoided.

Other mold forms than that shown may be employed as in this application I make no claim *per se* to any particular mold structure as the construction of the molds forms the subject of another application.

Instead of drawing the said plates 15 of the mold together before the mold is placed in the vulcanizing kettle, if that type of kettle is used which employs a hydraulic ram for pressing the molds in the kettle, then the molds may be laid one on top of the other in the kettle and the plates 15 pressed together by the action of the plunger in the kettle, so as to force the plates to the position shown in Fig. 6, after which the vulcanizing heat is turned on and the process of vulcanizing occurs. Of course, when used in a kettle of this type the bolts 22 would be removed before placing the molds in the kettle, the friction of the pipes in the holes 16 and the adhesion of the mold to the sides of the mold plates would be sufficient to prevent the mold plates from dropping off while being placed in the kettle.

Another modification of my method is to remove the mold plates 15 and 18 after the tire has been built up, as before described, and remove the core pipes 20 and 21 from the tire and then wrap the tire tightly with bandages instead of placing it under hydraulic pressure and vulcanizing the tire while bandaged in the manner stated. This bandaging method is well known in the art although I prefer to use the hydraulic method because of the greater compactness of the tire which is attained by that method. When a "non-skid" tread is used with the wrapped method of vulcanization, a metal tread plate is wrapped around the tread of the tire in the usual way, the tread plate being of the usual construction having the design of the tread thereon.

From the foregoing description, taken in connection with the accompanying drawings, it is thought my method will be readily understood by those skilled in the art.

What I claim is:—

1. The method of manufacturing cushion tires which comprises the following steps: first, building up a base structure including a non-stretchable belt, the latter being formed by winding alternate layers of cord, stretched to its approximate maximum limit of elongation while being laid, and cushion gum; second, forming a cushion element over the base structure by placing a band of cushion gum over said belt, then placing a series of rubber blocks transversely on the cushion gum layer while holding adjacent blocks separated by core elements having fixed cross sections, and placing another layer of cushion gum over the blocks and core elements; third, forming a second non-stretchable belt around said cushion gum element while constricting the same in a direction toward the axis of the tire; fourth, building up another structure around the outermost belt structure, said other structure including a tread section; fifth, applying a compacting pressure to the mass to compact the same and vulcanizing the mass while under pressure.

2. The method of manufacturing cushion tires which comprises the following steps: first, building up a base structure including a non-stretchable belt, the latter being formed by winding alternate layers of cord stretched to its approximate maximum limit of elongation while being laid and cushion gum; second, forming a cushion element over the base structure by placing a band of cushion gum over said belt, then placing a series of rubber blocks transversely on the cushion gum layer while holding adjacent blocks separated by core elements having fixed cross sections, and placing another layer of cushion gum over the blocks and core elements; third, forming a second non-stretchable belt around said cushion element while constricting the same in a direction toward the axis of the tire, and simultaneously holding the parts against lateral displacement and deformation; fourth, building up another structure around the outermost belt structure, said other structure including a tread section; fifth, applying a compacting pressure to the mass to compact the same and vulcanizing the mass while under pressure.

3. The method of manufacturing cushion tires which consists in forming a base structure, laying a layer of cushion gum around the base structure, placing radially on the cushion gum layer a series of cushion gum blocks spaced apart at intervals, covering said blocks with a peripheral layer of cushion gum, and forming around said layer of cushion gum a non-stretchable belt and simultaneously applying a constricting pressure to said blocks, forming a tread structure over said non-stretchable belt, applying lateral compacting pressure to the mass and vulcanizing the same while under pressure whereby the cushion blocks will be united to the adjacent bands of cushion gum to form a continuous slab with transverse perforations, substantially as specified.

4. The method of manufacturing cushion tires which consists in taking a ring, placing thereon a layer of rubberized fabric of greater width than the ring to leave overhanging edges, placing a filler into the channel of the ring, winding a layer of cords spirally around said filler in close convolutions while stretching the cord to its approximate maximum limit of elongation as it is laid, following the layer of cord with one or more alternate layers of cushion gum, fabric and cord and finally placing a thick layer of cushion gum over the whole, and then laying-over the first fabric layer edges on the extra layer of cushion gum thereby forming a base structure, and building up the remainder of the tire on said base structure and vulcanizing the same.

5. The method of manufacturing cushion tires which consists in taking a rim, placing thereon a layer of rubberized fabric of greater width than the rim to leave overhanging edges, winding a filler into the channel of the rim, winding a layer of cord spirally around said filler in close convolutions while stretching the cord to its approximate maximum limit of elongation as it is laid, following the layer of cord with one or more alternate layers of cushion gum, fabric and cord and finally placing a thick layer of cushion gum over the whole and then laying-over the first fabric layer edges on the extra layer of cushion gum, thereby forming a base structure, and then placing over said base structure a layer of cushion gum followed by at least one layer of fabric and cushion gum the last layer of cushion gum having a peculiar affinity for the rubber of cushion blocks, laying over the last layer of cushion gum a set of core elements spaced apart, placing blocks of cushion rubber in the spaces between the core elements and attaching the same by adhesive pressure to the adjacent layer of cushion gum, placing a layer of cushion gum over said cushion blocks and over said core elements to form a band around the same, and then forming a stretchless cord and fabric belt around said last named layer of cushion gum while simultaneously applying pressure toward the axis of the structure to compact the blocks around the core elements, and building up the remainder of the tire on said last named stretchless belt and then vulcanizing the mass.

6. The method of manufacturing tires which consists in first building up a base structure on a rim, then building up a cushion layer on said base structure by providing a pair of concentric rings of cushion gum with interposed cushion gum blocks spaced apart at intervals, then building up another stretchless belt around said cushion element and simultaneously compacting said cushion element by the application of pressure in a direction radially of the tire, and then building up the remainder of the tire structure on said endless belt structure and finally placing the entire mass under lateral compacting pressure and vulcanizing the same whereby the mass will be united into a unitary structure, said blocks and the adjacent bands of cushion gum thus being formed into an endless perforated slab of rubber.

HENRY M. LAMBERT.